Dec. 24, 1935. M. J. HEINZMANN 2,025,347
VARIABLE SPEED CONTROL DEVICE FOR CENTRIFUGAL GOVERNORS
Filed May 27, 1933 2 Sheets-Sheet 1
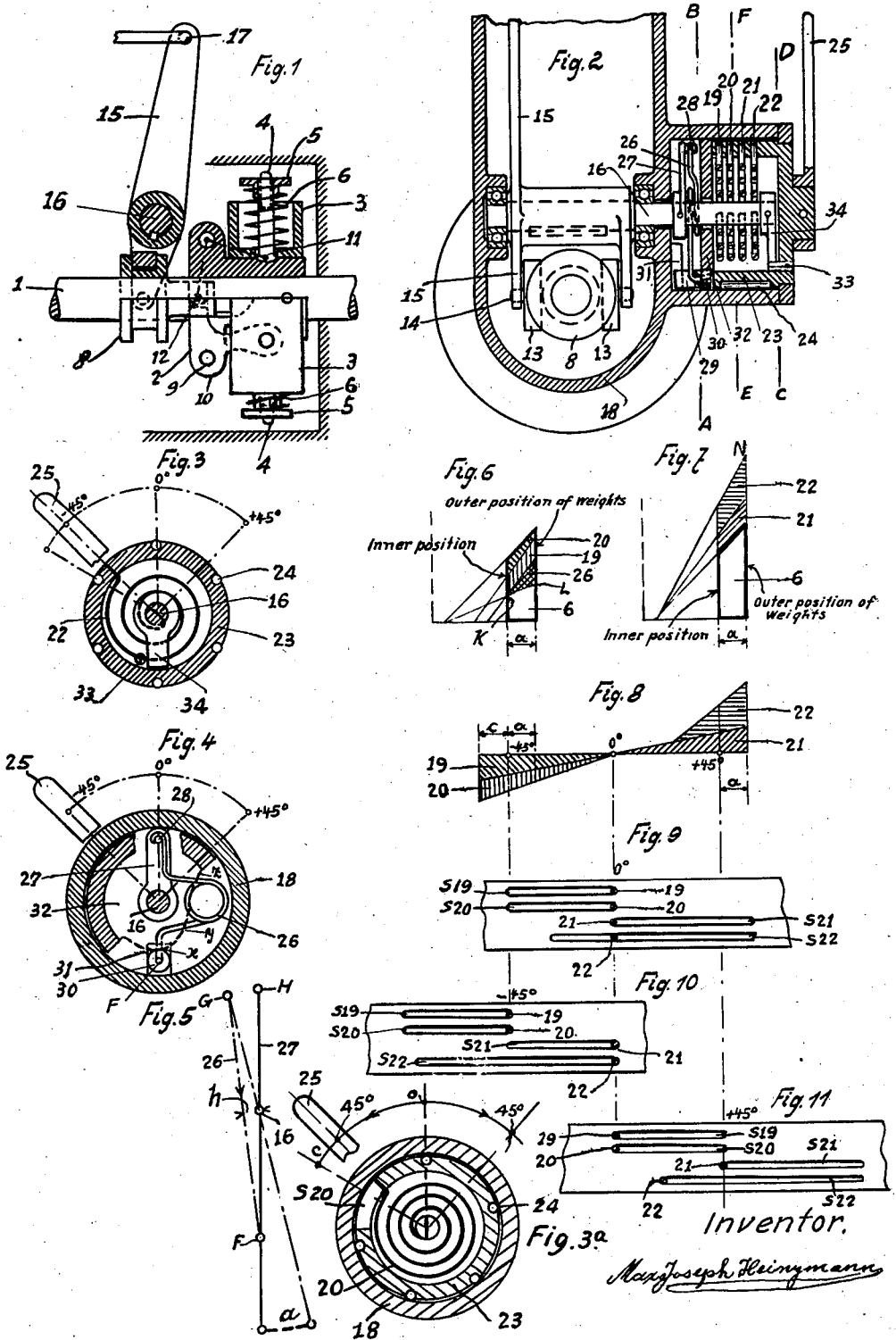
Inventor.
Max Joseph Heinzmann

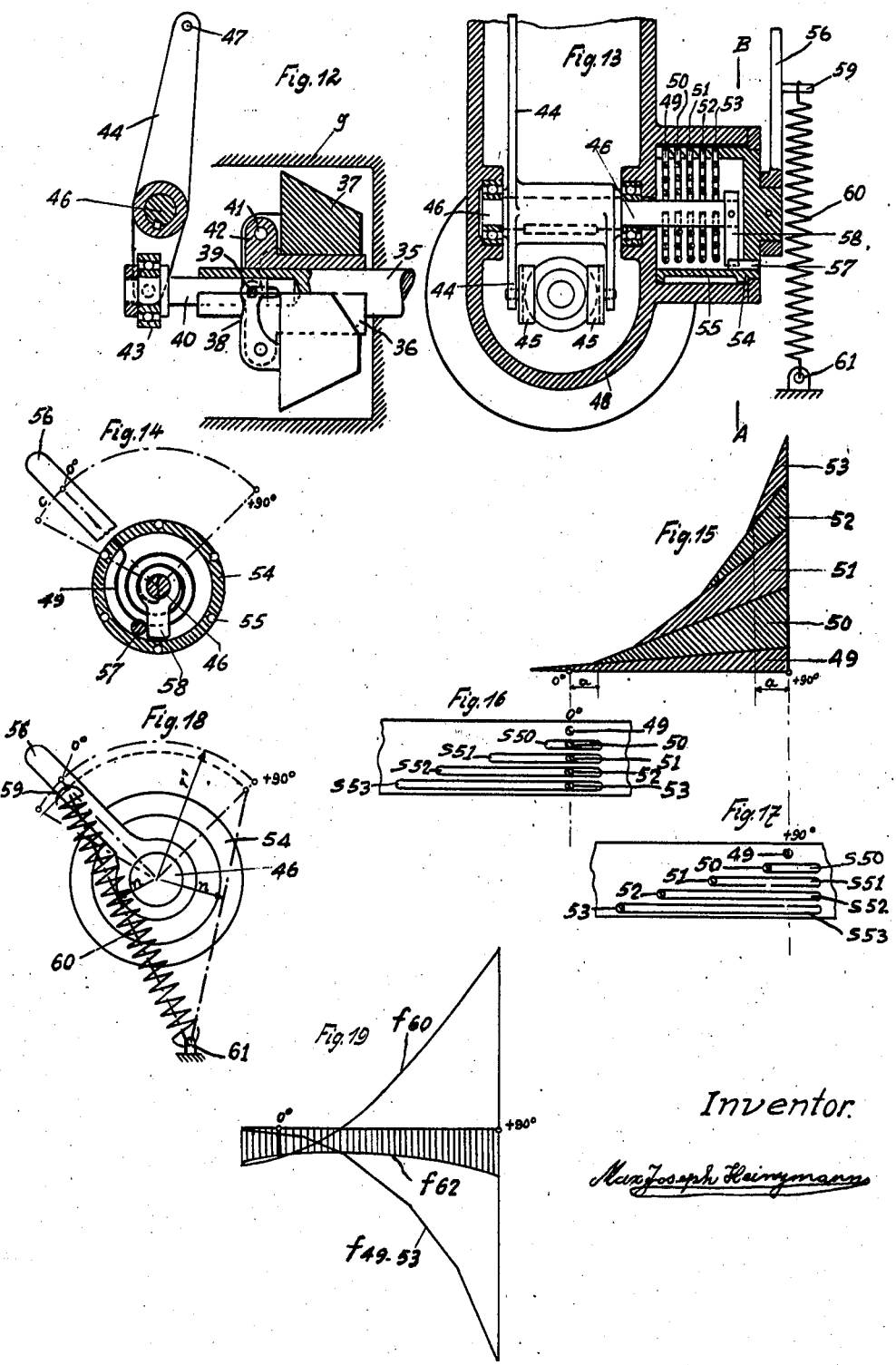

Patented Dec. 24, 1935

2,025,347

UNITED STATES PATENT OFFICE 2,025,347

VARIABLE SPEED CONTROL DEVICE FOR CENTRIFUGAL GOVERNORS

Max Joseph Heinzmann, Koetzschenbroda, Germany

Application May 27, 1933, Serial No. 673,187
In Germany June 6, 1932

10 Claims. (Cl. 264—3)

The present invention relates to that class of variable speed control devices with which continuous speed control throughout the whole speed range is possible. Compared with the speed control devices hitherto employed, the device described in the following specification has the advantage that it requires scarcely any additional space. This advantage is of great importance, considering that the general tendency in modern engine construction is to attain a compact, encased arrangement of all component parts. A further advantage is that it is possible to adapt and to arrange the springs contained in the speed control device according to every speed controlling range required and without changing the casing.

Referring to the drawings, Figs. 1–11 show an embodiment of the invention designed for small speed ranges and mainly for stationary engines, and diagrams. Fig. 1 is a longitudinal section of the governor shown, for example fixed to a through shaft. Fig. 2 is a section of the speed control device. Fig. 3 is a section of box 23 on a line C—D of Fig. 2. Fig. 3a is a section of box 23 in line E—F. Fig. 4 is a section of the casing 18 on a line A—B of Fig. 2. Fig. 5 is a lever diagram appertaining to the lever spring 26. Fig. 6 shows curve K—L of centrifugal forces, derived by adding the spring forces and registering them above the governor lift $a$ in lowest speed position. Fig. 7 shows the corresponding curve M—N for highest speed position. Fig. 8 is a diagram showing the additional spring forces acting on the regulating lever shaft 16. The spring forces have been registered above an axis of abscissas showing the angles about which the cylindrical box 23 is turned. Fig. 9 shows the unrolled cylindrical surface of the spring box 23 and slots in medium speed position. Fig. 10 same in lowest speed position. Fig. 11 same in highest speed position.

Figs. 12–19 show an embodiment of the invention designed for large speed ranges and mainly for vehicle engines, with diagrams. This governor is shown, for example, fixed to a shaft end. Fig. 12 is a longitudinal section of the governor. Fig. 13 is a section of the speed control device. Fig. 14 is a section of the spring box 54 on a line A—B of Fig. 13. Fig. 15 is a diagram showing the spring forces acting on the regulating lever shaft. The spring forces are drawn above an axis of abscissas showing the angles about which box 54 is turned. Fig. 16 shows the unrolled cylindrical surface of the spring box 54 and slots in lowest speed position. Fig. 17 same in highest speed position. Fig. 18 is a sketch showing the arrangement of the compensation spring 60 (Fig. 13). Fig. 19 is a curve diagram: curve $f_{49-53}$ shows forces exerted by the spiral springs 49, 50, 51, 52, 53 on lever 54; curve $f_{58}$ shows the forces exerted by spring 58 on lever 56; curve $f_{62}$ is the resulting curve which has been derived by algebraic addition of the forces shown by curves $f_{60}$ and $f_{49-53}$; curve $f_{62}$ registers the forces necessary for turning the spring box 54.

Referring to the drawings: (Figs. 1–11): The governor is fixed to a shaft 1, which may be the crank shaft or the cam shaft of the engine. Firmly fixed to shaft 1 is a governor support 2. Around the latter, two weights 3 are arranged. These are penetrated by two radial threaded bolts 4 firmly fixed to the governor support 2, provided at their ends with adjustable screw-caps 5, and surrounded by transverse springs 6. The springs 6 are thus in contact with the screw caps 5 and the bottoms of the cylindrical spaces in the weights 3. By means of bell cranks 7 (indicated by dotted lines), weights 3 are connected with the governor sleeve 8 slidably mounted on shaft 1. The bell cranks 7 are, by means of pins 9, pivotally connected with lugs 10 of the governor support 2. They are linked to the weights 3 by means of pins 11, and to the sliding governor sleeve 8 at point 12 by means of a sliding element or roller not shown. Two sliding elements 13, fixed by means of bolts 14 to the forked part of the regulating lever 15 engage with the governor sleeve 8. The regulating lever 15 is firmly fixed to the regulating lever shaft 16. The end 17 of the regulating lever 15 is, by means of rods and levers not shown, connected with the distributing mechanism of the engine, for instance with the fuel control member of the fuel injection pump. The regulating lever shaft 16 is supported by bearings in the governor casing 18, projecting with one end into that part of the casing containing the spring speed control device. Spiral springs 19, 20, 21, 22 will be seen (Figs. 2 and 3) firmly connected with their one end to the regulating lever shaft 16. The actuating lever 25 is firmly fixed to the spring box 23. It is actuated and adjusted in a manner not shown by means of rods and levers by a control quadrant or hand wheel. The outer ends of these springs are radially bent upward and project into slots $s19$—$s22$ in the cylindrical wall of the rotatable spring box 23 which, in order to reduce friction as much as possible, may be supported by bearing-rollers 24. For special reasons described later on, a lever spring 26 is further provided, which with its one end is hooked to the lever pin 28 of lever 27. Lever 27 is firmly connected with the regulating lever shaft 16 and is thus turned according to the lift $a$ of the governor sleeve 8. The other end of the lever spring 26 is bent at right-angles and is provided with a claw 29 and a roller 30 arranged side by side. When box 23 is turned, the claw 29 is guided by a radial slot 31 in the casing 18, while the roller 30 moves along a curved guide plate 32 firmly screwed to box 23. In order to stop the engine, a bolt 33 and a lever 34 are further provided. Bolt 33 is firmly fixed to the spring box 23, lever 34 to the regulating lever shaft 16.

Referring now to Figs. 12-19 of the drawings: The governor shown here is fixed to the end of shaft 35. This shaft may be the crank shaft of the engine, the cam shaft or a special shaft. Firmly seated on the shaft 35 is the governor support 36. The governor shown here is one for vehicle motors, and as these must be adapted to a speed range of 1:10, the transverse springs have, for technical reasons, been omitted. On the other hand however, the weights 37 are integrally combined with the bell cranks 38 and pivotally connected to lugs 42 on the governor support 36 by means of pins 41. The ends of the bell cranks are linked to a bolt 39 on the sliding control pin 40 of the governor. The latter is provided with a ball bearing 43 engaging with the regulating lever 44 by way of two sliding elements 45. The regulating lever 44 is firmly fixed to the regulating lever shaft 46, its end 47 being, by means of intermediate members not shown, connected with the distributing mechanism of the engine. The regulating lever shaft 46 is supported by bearings in the stationary governor casing 48, projecting with one end into the part of the casing containing the spring speed control device. Spiral springs 49, 50, 51, 52 and 53 (Figs. 13, 14) will be seen firmly connected with their one end to the regulating lever shaft 46. The outer ends of all springs are radially bent upward. Springs 49—53 project into slots s49—s53 of different length in the wall of the rotatable spring box 54. The outer end of spring 49 is firmly fixed in the same. In order to reduce friction as much as possible, spring box 54 may be supported by bearing-rollers 55. The actuating lever 56 is firmly fixed to the spring box 54. It is actuated and adjusted in a manner not shown by means of rods and levers by the foot pedal or by a control quadrant or by a hand wheel. In order to stop the engine, a bolt 57 and a lever 58 are provided. Bolt 57 is firmly fixed to the spring box 54, lever 58 to the regulating lever shaft. Hooked to pin 59 on lever 56 is a special compensating spring 60. The other hooked end of this spring is held by a lug 61 on the stationary casing.

The operation of the device shown by Figs. 1-11 is as follows: When the governor rotates together with the shaft 1, weights 3 are forced outward by centrifugal force, this outward movement being opposed by the action of the springs 6. The bell cranks 7 (dotted lines) transmit the movement of the weights 3 to the governor sleeve 8, which in turn acts on the regulating lever 15 fixed on the regulating lever shaft 16. The regulating lever shaft is, however, also subject to the action of the spiral springs 19, 20, 21, 22 and the lever spring 25 contained in the rotatable spring box 23. Four spiral springs are, for example, provided in the present case, but the number of the springs may be larger or smaller. When the spring box 23 is turned by means of the lever 25, the outer ends of the springs 19, 20, 21, 22 will be sooner or later moved along in backward or forward direction owing to the movement of the slots s19, s20, s21, s22 in the cylindrical wall of the spring box 23. The springs are thus strained and exert on the regulating lever shaft 16 torsional forces which by way of the regulating lever 15, the governor sleeve 8, the bell cranks 7 and the weights 3 are transmitted to the transverse springs 6, the spring force of which is thus increased or reduced according to the direction of the force exerted by springs 19, 20, 21, 22. In this way, the speed of the governor may be varied. In the following, all forces acting on the governor in an additional sense will be referred to as forces acting in plus direction, while forces acting on the governor in a subtractive sense will be referred to as forces acting in a negative sense. The turning angle or box 23 has, for example been chosen ±45°. Springs 21 and 22 operate in the positive range only, exerting forces which increase the force exerted by the transverse springs 6. When the spring box 23 is turned in plus direction for the purpose of varying the speed, (Fig. 9) spring 22 will be moved later than spring 21. The result is that the centrifugal diagram (Fig. 7) will become more inclined as the speed increases, that is, the degree of irregularity in the high speed region will be increased. Springs 19 and 20 operate in the negative range only, that is, in the low speed region, the forces acting on the governor sleeve 8 being then reduced.

The special lever spring 26 has been provided in order to reduce the degree of irregularity in the negative region. In Fig. 5, the uninterrupted black line shows the change of pressure from plus to minus, line H—I connecting both points of spring attachment running through the centre of the regulating lever shaft 16, spring 26 not being in action. As soon as the governor weights move outward, the outer end H of lever 27 moves to G, enabling spring 26 to act on lever 27 by a lever arm increasing to $h$ as the weights move outward. The forces thus acting on lever 27 act in a negative sense on the governor. As this subtractive force is smaller in the inner position of the weights than in the outer position of same, the centrifugal curve shown in Fig. 6 is rendered less static by the lever spring 26, whereby again the degree of irregularity is reduced for low speed. The functional law according to which the degree of irregularity is reduced in the negative range may be altered by altering the form of curve $x$—$y$—$z$ of the guide-plate 32. It is of advantage to choose this curve such that spring 26 is completely free of tension at the point of pressure change, as the same would otherwise cause an undesirable reduction in the degree of irregularity in the position range. By altering curve $x$—$y$—$z$ of the guide plate 32, further by fixing lever 27 at another angle on the regulating lever shaft 16, the spring 26 may be made to act on the governor according to another functional law if this should be required with regard to the governor construction or the extension of the speed range.

If the spring box 23 is turned more than 45° in minus direction, bolt 33 will engage lever 34 within the stopping lift $c$. The result is that by way of the governor sleeve 8 and the bell cranks 7, the weights 3 are moved apart simultaneously overcoming the pressure of the transverse springs 6 and shutting off the distributing mechanism.

Instead of four spiral springs and one lever spring it is, of course, also possible to employ larger or smaller number of springs. It is also possible to make one or more of the spiral springs act both in the positive and negative range by fixing the outer ends firmly in the wall of box 23. The points of fixing the outer spring ends must be chosen such that these springs are strained partly by being uncoiled and partly by being rolled up. Finally, the turning angle of box 23, chosen 90° in the drawing, may be made larger or smaller.

The operation of the device shown by Figs. 12-19 is as follows:

When the governor rotates together with the shaft 35, the governor weights 37 pivotally connected with the governor support 36 are forced outward by centrifugal force. As the weights 37 are integral with the bell cranks 38, the movement of the weights is first transmitted to the control pin slidably connected with the governor shaft 35, then by way of the ball bearing 43 and the sliding elements 45 to the regulating shaft 46 and the regulating lever 44 which then operates the distributing mechanism.

The rotatable spring box 54 is in this case, for example, provided with five spiral speed control springs 49, 50, 51, 52, 53. The turning angle of the box 54 is 90°, but may be made larger or smaller. The spiral springs act consecutively on the governor. As will be seen from the unrolled cylindrical box wall (Figs. 16 and 17), only the outer end of spring 49 is firmly fixed in same, while the ends of springs 50, 51, 52, 53 are radially bent upward and project into slots s50—s53 in the cylindrical wall. During lowest speed, only spring 49 is in action, while springs 50, 51, 52, 53 are free of tension. When the spring box 54 is, by means of lever 56 (Fig. 14) turned from 0 to 90°, in order to increase the speed, springs 50, 51, 52, 53 are consecutively strained and exert torsional forces on the regulating lever shaft which increases as the box is turned in plus direction. When the highest speed has been attained, all springs will be in action. The torsional forces are, by way of the regulating lever 44 and the control pin 40, transmitted to and influence the weights 37 such that the engine speed will increase. By suitably arranging the slots which move the springs, and by suitably dimensioning the springs, it is possible to keep the degree of irregularity nearly constant over the whole speed adjusting range. The degree of irregularity may also be subjected to any other functional law. More or less than five spiral springs may be employed, and finally, the turning angle of the box 54 may be any other angle.

The distributing mechanism is shut off and the engine stopped by bolt 57 moving lever 56 within the stopping range c when the spring box 54 is turned in minus direction beyond zero position. By way of the regulating lever shaft 46, the regulating lever 44 and the control pin 40, the weights 37 are then moved apart, the distributing mechanism being shut off.

With vehicle engines, the spring box 54 is mostly turned by means of a combination of rods acted upon by a pedal. It is desirable to keep the forces opposing the foot pressure approximately constant. They must further be directed in stopping sense, that is, the engine speed must decrease when the driver draws his foot away from the pedal. These demands are, in the present speed control device, satisfied by a special compensating spring 60 which, as shown in Fig. 18, is attached with its one end 59 to lever 56 and with its other end 61 to the stationary casing.

Both points of attachment are arranged in such a way, that when the engine is running at low speed, this spring will exert a force tending to turn the spring box 54 in stopping direction. When the engine is, however, running at high speed, the compensating spring 60 will exert a force acting in opposite (accelerating) direction on lever 56. Referring to Fig. 18, it will be seen that when the engine speed is increased within the low speed range, the effective lever arm of the spring will gradually diminish to zero; when the speed is then further increased (upper speed range), the lever arm will gradually increase from zero to a maximum value.

In Fig. 19, curves have been drawn showing the forces acting on lever 56. The axis of abscissas registers the angles about which the spring box 54 is turned, while the axis of ordinates registers the spring forces. Forces drawn below the axis of abscissas are such acting in stopping sense on lever 56; forces drawn above the axis of abscissas are forces acting in accelerating sense on same. Curve $f_{49-53}$ is a curve showing forces exerted by the spiral springs 49, 50, 51, 52, 53 on lever 56. As these forces are equal to but oppose the forces acting on the regulating lever shaft 46, curve $f_{49-53}$ only differs from the resulting curve shown in Fig. 15 in that it is turned upside down. Curve $f_{60}$ is the curve showing the forces exerted by the compensating spring 60 on lever 56 of the rotatable spring box 54. These forces may be computed by means of the formula:

$$f_{62}=f_{60}\cdot\frac{n}{\gamma_1},$$

that is they are equal to the product of the variable spring forces $f_{60}$ and the variable lever arm $n$ (Fig. 18) divided by the constant lever, arm $\gamma_1$.

Curve $f_{62}$, obtained by algebraic addition of curves $f_{60}$ and $f_{49-53}$ is the resulting curve showing forces necessary for turning box 54. These resulting forces are practically constant throughout the whole speed range and act in stopping sense, as required.

The governor shown in Figs. 1 and 2 (with sleeve) may, if weights integrally combined with bell cranks are used in place of weights pivotally connected with same, also be employed for vehicle engines. Similarly, the governor shown in Figs. 12 and 13 (with control pin) may, by using pivotally connected weights in place of weights integrally combined with bell cranks, be employed for stationary engines. I am aware that many changes may be made, and numerous details of construction may be varied through a wide range without departing from the principles of this invention, and I therefore do not purpose limiting the patent granted hereon, otherwise than necessitated by the prior art.

I claim:

1. A variable speed control device in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member, a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft and the outer ends engageable in said holes and slots, and a manually manipulative lever attached to said box for turning the same.

2. A variable speed control device in combination with a centrifugal speed governor comprising a governor shaft, a governor collar slidably mounted on said governor shaft, a stationary casing, a regulating lever shaft rotatively mounted in said casing, a regulating lever mounted rigidly on said regulating lever shaft having one end connected with said governor collar, a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft and the outer ends engageable in said holes and slots, and a manually manipulative lever attached to said box for turning the same.

3. A variable speed control device in combination with a centrifugal speed governor comprising a governor shaft, a governor control pin slidably fitted in the said governor shaft, a stationary casing, a regulating lever shaft rotatively mounted in said casing, a regulating lever mounted rigidly on said regulating lever shaft having one end connected with said governor control pin, a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft and the outer ends engageable in said holes and slots, and a manually manipulative lever attached to said box for turning the same.

4. A variable speed control devices in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member, a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft, and whereby the outer end of one of said flat spiral springs is firmly seated and held in one of the holes in said box, the outer ends of the remaining of said flat spiral springs being engageable in said slots, and a manually manipulative lever attached to said box for turning same.

5. A variable speed control device in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member, a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft, several of said flat spiral springs being with their outer ends firmly seated and held in holes in said box, the outer ends of the remaining of said flat spiral springs being engageable in said slots, and a manually manipulative lever attached to said box for turning same.

6. A variable speed control device in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft and the outer ends engageable in said holes and slots, a manually manipulative lever attached to said box for turning the same, a lever rigidly fixed to said regulating lever shaft, a lever spring cooperating at its one end with said lever, a claw and a roller on the other end of said spring, a radial slot in said stationary casing for guiding the claw, a curved guide plate rigidly connected with said rotatable box and adapted to guide said roller and whereby the tension of said lever spring may be varied when the said box is turned and the lever arm of said springs varied when the governor weights move apart.

7. A variable speed control device in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member, a box rotatably mounted in said casing having a plurality of holes and a plurality of parallel slots extending circumferentially therein, said box being concentric to said regulating lever shaft, a plurality of flat spiral springs located between said box and said regulating lever shaft, having the inner ends rigidly attached to said regulating lever shaft and the outer ends engageable in said holes and slots, a manually manipulative lever attached to said box for turning the same, a compensating spring attached with its one end to the said manually manipulative lever and with its other end to the said stationary casing and adapted to the low speed range to exert on the said box lever a bias tending to turn said box in stopping sense with a lever arm gradually decreasing to zero, and in the high speed range, to exert a bias tending to turn said box in accelerating sense with a lever arm increasing from zero to a maximum value.

8. A variable speed control device in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member, a box rotatably mounted in said casing having a plurality of holes and a plurality of parallel slots extending circumferentially therein, said box being concentric to said regulating lever shaft, bearing rollers distributed round said box for supporting same, a plurality of flat spiral springs located between said box and said regulating lever shaft, having the inner ends rigidly attached to said regulating lever shaft and the outer ends engageable in said holes and slots, and a manually manipulative lever attached to said box for turning the same.

9. A variable speed control device in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member, a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft and the outer ends engageable in said holes and slots, a manually manipulative lever attached to said box for turning the same, a catch in said box, a lever firmly fixed to the said regulating lever shaft and adapted to engage with said catch within the stopping lift and whereby the governor weights may be caused to move apart and shut off the fuel control gear.

10. A variable speed control device in combination with a centrifugal speed governor comprising a governor shaft, a governor control member slidably mounted and guided by said governor shaft, a stationary casing, a regulating lever shaft rotatively mounted in said casing, a regulating lever mounted rigidly on said regulating lever shaft having one end connected with said governor control member, a box rotatably mounted in said casing having a plurality of holes and a plurality of parallel slots extending circumferentially therein, said box being concentric to said regulating lever shaft, a plurality of flat spiral springs located between said box and said regulating lever shaft having the inner ends rigidly attached to said regulating lever shaft and the outer ends engageable in said holes and slots, a manually manipulative lever attached to said box for turning the same, a lever rigidly fixed to said regulating lever shaft, a lever spring cooperating at its one end with said lever, a roller on the other end of said spring, a curved guide plate firmly connected with said rotatable box and adapted to guide said roller, said springs, said roller, said guide plate and said lever engaging with the said lever spring being chosen and arranged for attaining least possible variation of the degree of irregularity or variability according to a certain functional law.

MAX JOSEPH HEINZMANN.